United States Patent [19]

Asaba

[11] Patent Number: 4,512,152
[45] Date of Patent: Apr. 23, 1985

[54] ENGINE WITH SUPERCHARGER
[75] Inventor: Takao Asaba, Shizuoka, Japan
[73] Assignee: Yamaha Hatsudoki Kabushiki Kaisha, Japan
[21] Appl. No.: 529,983
[22] Filed: Sep. 8, 1983

Related U.S. Application Data

[62] Division of Ser. No. 317,346, Nov. 2, 1981, abandoned.

[30] Foreign Application Priority Data

May 9, 1981 [JP] Japan ................................ 56-67339

[51] Int. Cl.³ ...................... F02B 37/00; F02B 75/18; F02B 3/00
[52] U.S. Cl. ....................................... 60/601; 60/611; 123/52 MB; 123/383; 123/456; 123/458; 123/463
[58] Field of Search .................. 60/611, 601; 123/458, 123/456, 463, 383, 52 M, 52 MB

[56] References Cited

U.S. PATENT DOCUMENTS

| | | | |
|---|---|---|---|
| 1,597,787 | 8/1926 | Hausser | 123/463 |
| 2,673,556 | 3/1954 | Reggio | 123/463 |
| 2,776,720 | 1/1957 | Reggio | 60/601 |
| 2,781,752 | 2/1957 | Bussche | 123/463 |
| 2,841,130 | 7/1958 | Reggio | 123/383 |
| 3,505,983 | 4/1970 | Hartel | 123/52 MB |
| 3,844,263 | 10/1974 | Endo | 123/458 |
| 3,868,822 | 3/1975 | Keller | 60/611 |
| 4,227,372 | 10/1980 | Kakimoto | 60/611 |
| 4,244,333 | 1/1981 | Matsumoto | 123/52 M |

FOREIGN PATENT DOCUMENTS 137516 10/1979 Japan ............................. 123/52 MB

OTHER PUBLICATIONS

Yamaguchi, J., "More Turbos from Japan", Automotive Engineering, Apr. 1981, p. 87.

*Primary Examiner*—Douglas Hart
*Attorney, Agent, or Firm*—Ernest A. Beutler

[57] ABSTRACT

Embodiments of supercharged internal combustion engines employing improved induction systems for providing better performance at idle low speeds and upon acceleration. A simplified bypass and pressure relief system is incorporated in each embodiment for permitting the engine to induct air directly and independently of the supercharger at low speeds and on acceleration from low speed. A pressure relief valve is also incorporated for relieving excess pressure from the supercharger back to the bypass in the event of excessive supercharger pressures. The system also embodies a fuel injection device that has the pressure of fuel injection controlled in relation to the pressure in the intake passage into which it discharges. Furthermore, an auxiliary induction system is provided for inducing turbulence in the intake charge at low engine speeds to improve efficiency under these conditions.

18 Claims, 5 Drawing Figures

ENGINE WITH SUPERCHARGER

This application is a division of application Ser. No. 317,346, filed Nov. 2, 1981, now abandoned.

BACKGROUND OF THE INVENTION

This invention relates to an engine with a supercharger and more particularly to an improved induction and fuel feed system for a supercharged engine.

The use of superchargers is well known to increase the performance of an engine of given engine displacement. Superchargers, particularly those of the centrifugal type, do not provide any significant boost to the intake charge at low engine speeds. The effect of the supercharger is more pronounced at higher engine speeds. Furthermore, when accelerating from low engine speeds, the supercharger, particularly those of the centrifugal and tubrocharged type, tend to lag in acceleration relative to the degree of throttle opening. Thus, at low speeds and under such low speed accelerating conditions, the supercharger may actually reduce rather than increase the engine performance. It has, therefore, been proposed to provide a bypass around the supercharger which is valved in such a way so as to permit air to enter the induction system without flowing across the supercharger at low speeds and when the engine is not developing significant boost.

It is also known that it is desirable to limit the maximum boost generated by the supercharger. If excessive induction system pressure is provided as a result of the supercharger, the engine may have a tendency to preignite and/or be overloaded and fail. Therefore, it has also been proposed to provide a pressure relief valve on the outlet side of the supercharger that will limit maximum pressure. If, however, the over pressure is relieved to the atmosphere and the engine is of the injected type, the air flow meter will sense a greater air flow than has actually existed and provide an overly rich fuel discharge at times when the pressure relief valve is open. If, on the other hand, the engine is of the carbureted type, the fuel air mixture may be discharged to the atmosphere through the pressure relief valve resulting in obvious fuel wastage as well as possible safety hazards. It has, therefore, been further proposed to provide a separate passage which can be used to return the excess pressure back to the intake side of the compressor. Of course, such an arrangement obviously complicates the piping associated with the engine.

It is, therefore, a first principal object of this invention to provide an improved induction system for a supercharged engine including a supercharger bypass and a pressure relief system.

It is a further object of this invention to provide an induction system for a supercharged engine wherein the bypass around the supercharger is also employed as the means for relieving excess pressure in the induction system.

As has been noted above, when fuel injection is employed it is desirable to maintain the accurate fuel air ratio by controlling the amount of fuel discharged in relation to the total air flow. In many instances, however, the pressure in the induction system at the point of fuel discharge can vary significantly and thus alter the amount of fuel discharged by the fuel injection nozzle. This is particularly true in conjunction with supercharged engines. With such engines, when the supercharger is developing a high degree of boost the fuel injection nozzle will have to discharge into a higher pressure area than under conditions of low boost. This can cause the engine to run unduly lean under high boost conditions with the resultant damage.

It is, therefore, a further object of this invention to provide an improved fuel injection system for an internal combustion engine.

It is another object of the invention to provide an improved fuel injection system for a supercharged internal combustion engine.

As has been discussed, even supercharged engines are not particularly efficient in their running at low engine speeds. This is one of the reasons it has been proposed to provide a bypass around the supercharger through which the intake air may flow at low speeds and under acceleration from low speed. Even when such bypasses are employed, however, the engine, like a normally aspirated engine, is not particularly efficient under these running conditions. One reason for the inefficiency at low speeds is the fact that the intake charge is delivered to the chambers at an extremely slow velocity. This has a tendency to cause fuel condensation resulting in the necessity of providing overly rich mixtures and the extremely slow flame propagation which occurs in the combustion chamber.

It is, therefore, a still further principal object of this invention to provide an improved efficiency induction system for a supercharged internal combustion engine.

It is another object of the invention to provide an induction system for a supercharged engine that offers improved effficiency and running characteristics at low engine speeds.

SUMMARY OF THE INVENTION

A first feature of this invention is adapted to be embodied in an induction system for a supercharged internal combustion engine having an intake device defined in part by a wall and which has an outlet communicating with a chamber of the engine and a supercharger inlet for delivering a boosted charge to the intake device. An atmospheric inlet communicates with the intake device through first check valve means in the wall which is adapted to close when the pressure in the intake device exceeds the pressure at the atmospheric inlet by a predetermined amount. Second check valve means are also provided in the wall that communicate the intake device with the atmospheric inlet. The second check valve means is adapted to open and provide communication between the intake device and the atmospheric inlet when the pressure in the intake device exceeds a predetermined value.

Another feature of the invention is adapted to be embodied in a fuel feed and induction system for an internal combustion engine that includes a fuel injection nozzle and a fuel pump for delivering fuel to the fuel injection nozzle. In accordance with this feature of the invention, means are provided for varying the pressure at which the fuel pump delivers fuel to the fuel injection nozzle in relation to a pressure at a point in the system.

Still another feature of the invention is adapted to be embodied in an induction system for a plural chamber, internal combustion engine comprising a plurality of intake passages each serving a respective chamber, charge forming means for delivering a fuel air charge to the chambers, throttle valve means for controlling the flow through the intake passages and supercharger means for providing a boost to the charge delivered to the intake passages. In accordance with this feature of the invention, balance passage means interconnect the intake passages with each other downstream of the throttle valve means.

DETAILED DESCRIPTION OF THE PREFERRED EMBODIMENTS

Figure 1:
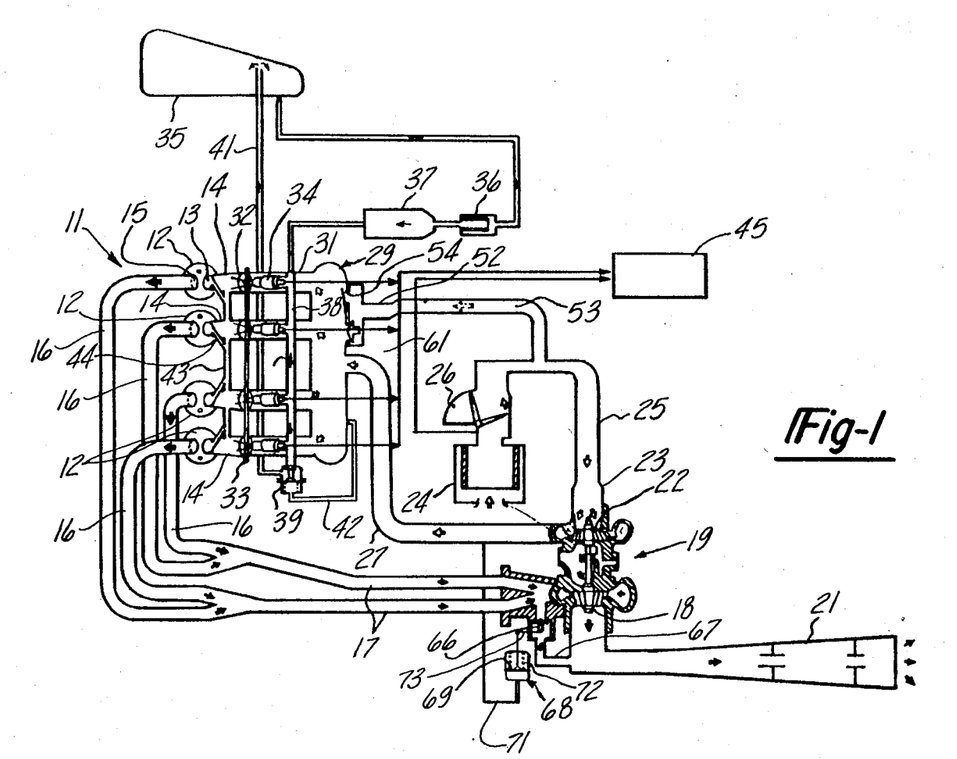
FIG. 1 is a partially schematic, diagramatic view showing the application of this invention to an internal combustion engine.

Referring first to FIG. 1, an embodiment of the invention as applied to a four cylinder reciprocating type of engine, shown in part schematically and indicated generally by the reference numeral 11, is illustrated. Although the invention is described in conjunction with an engine of this type, it is to be understood that the invention is susceptible of use with engines of other cylinder numbers or configurations as well as rotary type engines. Also, the engine 11 is of the turbocharged type and it should be understood that certain facets of the invention may have utility with normally aspirated engines or engines embodying other types of superchargers. The term supercharger is used herein generically to cover all types of supercharging devices including turbochargers. Certain aspects of the invention, however, may have more utility with turbocharged type of engines. In addition, as will be described, the engine 11 is of the fuel injected type but again certain facets of the invention may be employed with normally carbureted engines.

As has been noted, the engine 11 has four cylinders 12 each of which is provided with an induction system including an intake valve 13 and a main intake passage 14, which will normally be formed in the cylinder head of the engine. Each cylinder 12 is also provided with an exhaust valve 15 that controls the flow of exhaust gases from the respective cylinder 12 into an exhaust pipe 16 which also includes an exhaust passage formed in the cylinder head. In the illustrated embodiment, pairs of the exhaust pipes 16 merge into collector pipes 17 which deliver the exhaust gases to a turbine stage 18 of a turbocharger, indicated generally by the reference numeral 19. From the turbine stage 18 the exhaust gases are discharged to the atmosphere via a muffler and exhaust pipe 21.

The turbocharger 19 has a compressor stage 22 that includes an impeller which is affixed for rotation with the impeller of the turbine stage 18 in a known manner. The compressor stage 22 has an inlet 23 which receives an atmospheric air charge from an air cleaner, indicated schematically at 24, via a supercharger inlet conduit 25. An air flow meter 26 is positioned in the conduit 25 immediately downstream of the air cleaner 24. The compressor stage 22 discharges through a compressor outlet conduit 27 which, in turn, delivers to a supercharger inlet 28 of an intake device in the form of an enlarged volume plenum chamber, indicated generally by the reference numeral 29. The plenum chamber 29 has a plurality of outlet conduits or runners 31 that communicate with the engine intake ports 14. Throttle valves 32 are positioned in the runners 31 and are affixed to a common throttle valve shaft 33 for controlling the flow through the runners 31. The throttle valve shaft 33 is operated in any known manner.

Fuel injection nozzles 34 are positioned in the plenum chamber runners 31 and discharge immediately adjacent the periphery of the throttle valves 32. Fuel is supplied to the injection nozzles 34 from a fuel tank 35 via a filter 36 and fuel pump, indicated schematically at 37. The fuel is delivered to the injection nozzles 34 via a fuel manifold 38 having a pressure control valve 39 located at one end thereof. The pressure control valve 39 selectively communicates the manifold 38 with a return conduit 41 that goes back to the fuel tank 35. The valve 39 has a sensing passage 42 that communicates with the interior of the plenum chamber 29 so as to bypass an amount of fuel back to the fuel tank through the return conduit 41 so as to provide a fuel discharge from the nozzles 34 that is at a predetermined pressure above the pressure in the intake passages and specifically the pressure in the plenum chamber 29. It should be readily apparent that as the boost pressure of the turbocharger compressor stage 22 increases the pressure into which the injection nozzles 34 discharge also increases. The valve 39 ensures that the discharge pressure of the nozzles 34 will be constant in relation to the induction system pressure so as to avoid a reduction in fuel discharge under increased boost conditions as might otherwise occur.

As is well known, the turbocharger 19 does not develop any significant boost at low engine speeds. At these low speeds there is a very slow air velocity flowing through the intake passages 14 into the cylinders 12. As a result of this slow speed of airflow, the fuel air mixture is not particularly well distributed and may, in fact, cause condensation which normally requires the use of a richer than otherwise desired mixture. In order to improve running under these conditions, a balance passage 43 is provided which has a plurality of relatively small passages 44 that intersect the main intake passages 14 adjacent the intake valves 13. The intersection is preferably at an acute angle. When one cylinder 12 is on its intake stroke, the intake charge will be drawn into this cylinder through the small passage 44 from the balance passage 43. This intake charge will be drawn from the portion of the remaining intake passages 14 between the intake valves 13 and the throttle valves 32 of the cylinders which are not on an intake stroke. Because of the small size of the passages 44 this charge will be inducted into the cylinder 12 at a very high velocity. This high velocity intake charge increases turbulence in the combustion chamber at the time of ignition and increases the rate of flame propagation. Thus, good fuel efficiency and exhaust gas emission control is provided due to the use of the balance passage 43 and small intake passages 44.

In addition to the pressure control valve 39, the amount of fuel discharged by the injection nozzles 34 is controlled by a control device, indicated schematically at 45 which may be in the form of a computer and which receives a signal from the air flow device 26 so as to provide an amount of fuel discharge from the nozzles 34 that is related to total air flow through the system.

In addition to improving efficiency at low engine speeds through the use of the balance passages 43 and intake passages 44, an arrangement is provided for bypassing the supercharger compressor stage 22 during conditions when its boost pressure is not significant. In addition, this bypass permits additional air to flow into the system during acceleration from low speeds at such times as the compressor stage 22 has not accelerated. Furthermore, a pressure relief system is also incorporated for ensuring that the compressor stage 22 will not develop excessive pressures in the induction system. This arrangement may be best understood by further reference to FIGS. 2 through 4 in addition to FIG. 1.

Figure 2:
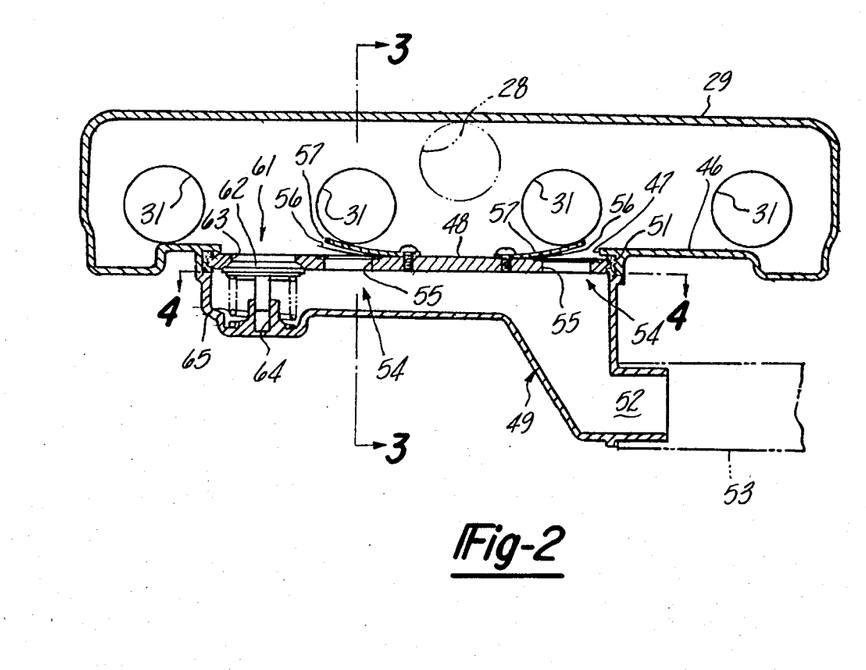
FIG. 2 is an enlarged, cross sectional view of a portion of the intake system of the engine shown in FIG. 1.
Figure 3:
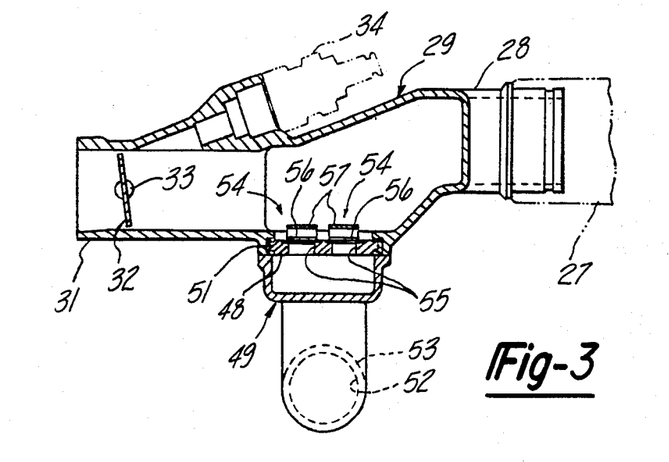
FIG. 3 is a cross sectional view taken along the line 3—3 of FIG. 2.
Figure 4:
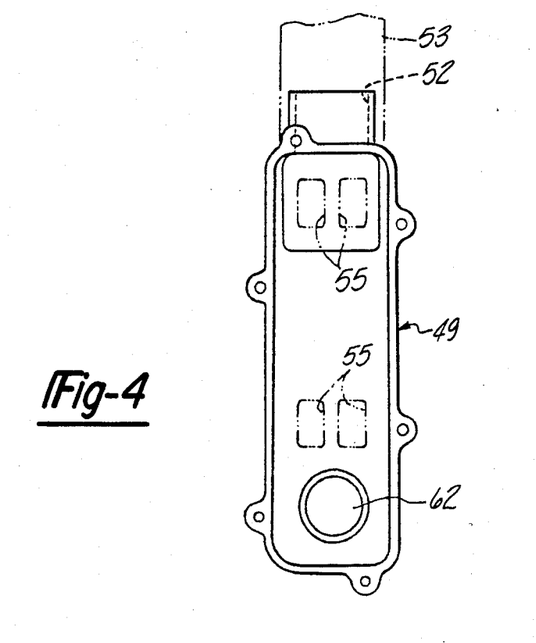
FIG. 4 is a cross sectional view taken along the line 4—4 of FIG. 2.

The plenum chamber 29 has a wall 46 that defines an opening 47 that is closed by a valve plate 18. The valve plate is clamped to the wall 46 around the opening 47 by means of a valve box, indicated generally by the reference numeral 49. The valve box 49 has a peripheral flange which engages the valve plate 48 and a seal or gasket 51 so as to provide an airtight seal between the plenum chamber 29, valve plate 48 and valve box 49. The valve box 49 has an atmospheric air inlet 52 that receives filtered air from the air cleaner 24 via an atmospheric air bypass conduit 53. The conduit 53 intersects the supercharger inlet conduit 25 downstream of the air flow detector 26 and upstream of the supercharger compressor stage inlet 23.

One or more check valves, indicated generally at 54, permit atmospheric air to flow into the plenum chamber 29 from the valve box 49 without having passed across the impeller of the compressor stage 22. The check valves 54 include openings 55 that are formed in the valve plate 48. Reed type valve elements 56 operate to control the flow through the openings 55. The valve elements 56 are provided with back up plates 57, which are also affixed to the valve plate 48 so as to limit the stress upon the valve elements 56 and to limit their maximum degree of opening. The valve elements 56 are arranged so that they will open at a predetermined pressure differential between the interior of the plenum chamber 29 and the atmospheric pressure which exists in the valve box 49. At such times as the turbocharger compressor stage 22 is not delivering any significant boost, the pressure in the plenum chamber 29 will be less than atmospheric due to the successive intake strokes of the cylinders 12. Under these conditions, the valve elements 56 will open due to the pressure difference across them and intake air may flow into the cylinders 12 from the conduit 53 without having passed across the impeller of the compressor stage 22. The same condition will occur during acceleration from low speed until the compressor stage 22 develops significant boost so as to urge the valve elements 56 to their closed positions. It should be noted that since the conduit 53 is downstream of the air flow detector 26, the amount of fuel discharge will be accurately controlled regardless of which path the intake air flows to the cylinders 12.

In addition to providing an atmospheric air inlet to the plenum chamber 29, the valve box 49 and valve plate also includes a pressure responsive check valve, indicated generally by the reference numeral 61 for limiting the maximum pressure in the plenum chamber 29. The check valve 61 is of the poppet valve type and includes a poppet valve element 62 that cooperates with an opening 63 in the valve plate 48. The valve element 62 has a stem portion which is guided in a bore 64 of the valve box 49. A compression spring 65 normally urges the poppet valve element 62 into a closed position with the opening 69 so as to prevent any bypass air flow. In the event the supercharger compressor stage 22 develops excessive boost, the pressure in the plenum chamber 29 will rise sufficiently so that the pressure of the spring 65 on the poppet valve element 62 will be overcome and the check valve 61 will open so that the excess pressure will be relieved. This excess pressure is relieved into the valve box 49 and back into the intake system through the atmospheric inlet 52 and conduit 53. Thus, the relief air will not be discharged directly to the atmosphere. Furthermore, the total air flow will still be sensed by the detector 26 so as to accurately control the fuel air mixture.

The maximum pressure delivered by the turbocharger compressor stage 22 is also controlled by means of a waste gate valve 66 (FIG. 1). The waste gate valve 66, when open, delivers a portion of the exhaust gases through a bypass conduit 67 directly to the muffler 21 without flowing across the turbine stage 18. This will, therefore, limit the maximum boost.

The waste gas valve 66 is controlled by a pressure responsive device, indicated generally by the reference numeral 68, which consists of a diaphragm 69 that divides the device 68 into a sensing chamber, which senses supercharger outlet pressure via a sensing conduit 71 and an atmospheric chamber in which a coil compression spring 72 is positioned. The spring 72 normally urges the diaphragm 69 downwardly so as to cause the waste gate valve 66 to be moved upwardly to a closed position by means of an interconnecting bellcrank 73. When the boost pressure exceeds a predetermined level as sensed through the conduit 71, the diaphragm 69 will be urged upwardly against the action of the spring 72 to open the waste gate valve 66 and permit a certain proportion of the exhaust gases to flow directly to the muffler 21 via the bypass conduit 67. Thus, maximum boost will also be limited by this device.

In operation, when the engine 11 is running at low speeds the turbocharger compressor stage 22 will not deliver any significant boost. The waste gate valve 66 will, therefore, be closed and all exhaust gases will be delivered to the turbine stage 18. Since the turbocharger compressor stage 22 is not delivering any significant boost, atmospheric air will flow through the open check valves 54 into the plenum chamber 29 through the bypass conduit 53 and atmospheric inlet 52. This air flow will, however, be sensed by the detector 26 so that the control device 45 will provide an accurate control of fuel from the fuel injection nozzles 34. As has been noted, the balance passage 43 and small intake passages 44 will ensure that the intake charge is delivered to the chambers 12 at a high velocity so as to improve low speed running.

When the engine is suddenly accelerated, the atmospheric air will still flow into the plenum chamber 29 through the open check valves 54 until the turbocharger compressor stage 22 has accelerated to a point where significant boost will be generated. At this time, the check valves 54 will close and the air will be delivered to the plenum chamber 29 through the supercharger inlet 28. During such conditions of increased boost pressure, the valve 39 will ensure that fuel is delivered to the injection nozzles 34 at an increased pressure.

As the boost pressure continues to increase as engine speed increases, eventually the waste gate valve 66 will be open and less exhaust gases will be delivered to the turbocharger turbine stage 18. If, however, the boost pressure still is too high the check valve 61 will open to relieve the pressure back into the induction system downstream of the flow detector 26. It should be readily apparent, therefore, that a highly efficient induction system is provided.

When the engine is running at high speed and the throttle valves 32 are suddenly closed, the overrunning of the compressor stage 22 will cause both the waste gate valve 66 to be open due to the suddenly increased pressure in the plenum chamber 29 and, additionally, the check valve 61 may be open to relieve the pressure. Thus, the engine will be protected under this overrunning condition.

Figure 5:
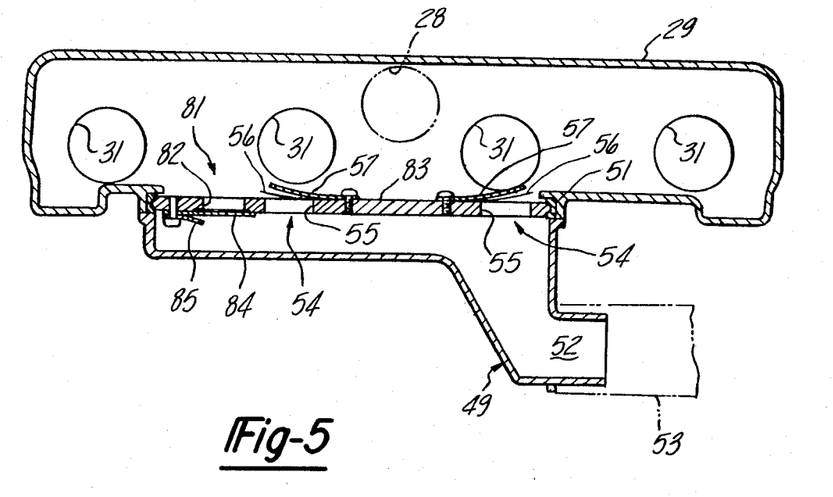
FIG. 5 is a cross sectional view, in part similar to FIG. 2, showing another embodiment of the invention.

FIG. 5 illustrates another embodiment of the invention wherein the pressure relief check valve is of the reed valve type. The bypass check valves are the same as in the previously described embodiment as is the general construction of the plenum chamber 29. For that reason, these elements have been identified by the same reference numerals and will not be described again.

In this embodiment, a reed type pressure relief valve is illustrated generally by the reference numeral 81. The reed type check valve 81 includes a generally rectangular opening 82 formed in a valve plate 83. A reed type valve element 84 is affixed to the back side of the valve plate 83 and is backed up by a more rigid stop element 85 so as to limit the maximum degree of opening of the valve element 85. As in the previously described embodiment, if the pressure in the plenum chamber 29 becomes excessive due to the generation of too much turbocharger boost, as may occur during sudden closing of the throttle valves, the valve element will be biased by this pressure to its open position and relieve the pressure back into the induction system. The check valves 54 operate as in the previously described embodiment and their operation will not be described again.

It is believed that it should be readily apparent to those skilled in the art that an induction system has been disclosed which provides good efficiency throughout the entire engine speed and load ranges and which embodies a supercharger for improving power output at high speeds and a bypass and auxiliary induction system which improves efficiency at low speeds. In addition, the bypass and a pressure relief valve are embodied in an extremely compact high efficiency system that ensures that the total air flow through the system will be measured under all operating conditions. Although certain modifications have been disclosed, others will present themself to those skilled in the art, without departing from the spirit and scope of the invention, as defined by the appended claims.

I claim:

1. An induction system for a supercharged internal combustion engine having an intake device comprising a plenum chamber defined in part by a separable planar wall, said intake device having an outlet communicating said plenum chamber with a chamber of the engine, a supercharging inlet communicating with said intake device plenum chamber for delivering a boosted charge thereto, an atmospheric inlet communicating with said intake device plenum chamber through first check valve means supported in said wall, said first check valve means being adapted to close when the pressure in said intake device plenum chamber exceeds the pressure at said atmospheric inlet by a predetermined amount, and second check valve means supported in said wall communicating said intake device plenum chamber with said atmospheric inlet, said second check valve means being adapted to open when the pressure in said intake device plenum chamber exceeds a predetermined value.

2. An induction system as set forth in claim 1 further including a valve box affixed to the intake device and surrounding the separable wall and affixing said wall to the remainder of said intake device.

3. An induction system as set forth in claim 1 further including a supercharger having an inlet and an outlet communicating with the supercharger inlet of the intake device, there being a common air intake communicating with said supercharger inlet and said intake device atmospheric inlet so that all air flowing into the induction system flows through said common intake.

4. An induction system as set forth in claim 3 further including a valve box affixed to the intake device and surrounding the separable wall and affixing said wall to the remainder of said intake device.

5. An indication system as set forth in claim 1 wherein one of the check valve means comprises reed valve means.

6. An induction system as set forth in claim 5 wherein both of the check valve means comprises reed valve means.

7. An induction system as set forth in claim 5 wherein one of the check valve means comprises a poppet valve.

8. An induction system as set forth in claim 5 wherein the associated supercharger is a turbocharger.

9. An induction system as set forth in claim 5 wherein the engine has a plurality of chambers, the intake device plenum chamber having outlets communicating with intake passages serving each of the chambers.

10. An induction system for a supercharged internal combustion engine as set forth in claim 1 further including a fuel injection nozzle discharging into said induction system downstream of said intake device outlet, a fuel pump for delivering fuel to said fuel injection nozzle, and means for varying the pressure at which said fuel pump delivers fuel to said fuel injection nozzle in relation to a pressure at a point in said system.

11. A fuel feed and induction system as set forth in claim 10 wherein the pressure sensed is that in the portion of the induction system where the fuel injection nozzle discharges.

12. A fuel feed and induction system as set forth in claim 11 wherein the fuel injection nozzle injects into an intake passage and the pressure is the pressure in the intake device.

13. An induction system for a supercharged internal combustion engine as set forth in claim 1 wherein the engine has a plurality of chambers and a plurality of intake passages serving said chambers, said intake passages extending from the intake device outlet to said chambers, charge forming means for delivering a fuel air charge to said chambers, throttle valve means in said intake passages for controlling the flow therethrough, and balance passage means communicating said intake passages with each other downstream of said throttle valve means.

14. An induction system as set forth in claim 13 wherein the throttle valve means comprise a plurality of interconnected throttle valves, there being one of said throttle valves in each of the intake passages.

15. An induction system as set forth in claim 14 wherein the charge forming means comprises fuel injection nozzle means.

16. An induction system for a supercharged internal combustion engine as set forth in claim 3 further including a fuel pump for delivering fuel to the fuel injection nozzles, and means for varying the pressure at which said fuel pump delivers fuel to said fuel injection nozzles in relation to a pressure at a point in said system.

17. An induction system as set forth in claim 16 wherein the pressure sensed is that in the portion of the induction system where the fuel injection nozzle discharges.

18. An induction system as set forth in claim 17 wherein the fuel injection nozzle injects into an intake passage and the pressure is the pressure in the intake device.

* * * * *

UNITED STATES PATENT AND TRADEMARK OFFICE
CERTIFICATE OF CORRECTION

PATENT NO.   : 4,512,152
DATED        : April 23, 1985
INVENTOR(S)  : Takao Asaba It is certified that error appears in the above-identified patent and that said Letters Patent is hereby corrected as shown below:

Column 5, line 11
   "18" should be --48--

Column 6, line 17
   "gas" should be --gate--

Column 8, line 18, claim 5

"indication" should be --induction--

Column 8, line 67, claim 16

"3" should be --13--

Signed and Sealed this

Fifteenth Day of July 1986

[SEAL]

Attest:

DONALD J. QUIGG

Attesting Officer

Commissioner of Patents and Trademarks